(12) United States Patent
Baumann et al.

(10) Patent No.: US 7,148,286 B2
(45) Date of Patent: Dec. 12, 2006

(54) LASER-SINTERING POWDER CONTAINING TITANIUM DIOXIDE PARTICLES, PROCESS FOR ITS PREPARATION, AND MOLDINGS PRODUCED THEREFROM

(75) Inventors: Franz-Erich Baumann, Dülmen (DE); Sylvia Monsheimer, Haltern am See (DE); Maik Grebe, Bochum (DE); Wolfgang Christoph, Marl (DE); Thomas Schiffer, Haltern am See (DE); Heinz Scholten, Haltern am See (DE)

(73) Assignee: Degussa AG, Dusseldorf (DE)

( * ) Notice: Subject to any disclaimer, the term of this patent is extended or adjusted under 35 U.S.C. 154(b) by 52 days.

(21) Appl. No.: 10/685,525

(22) Filed: Oct. 16, 2003

(65) Prior Publication Data

US 2004/0138363 A1 Jul. 15, 2004

(30) Foreign Application Priority Data

Oct. 17, 2002 (DE) ................. 102 48 406

(51) Int. Cl.
*C08K 3/22* (2006.01)
*C08L 77/00* (2006.01)

(52) U.S. Cl. ................ 524/497; 524/413; 524/538
(58) Field of Classification Search ............... 524/497, 524/413, 538
See application file for complete search history.

(56) References Cited

U.S. PATENT DOCUMENTS

| | | | |
|---|---|---|---|
| 3,910,861 A * | 10/1975 | Wolvers et al. ............. 524/847 |
| 4,689,364 A | 8/1987 | Mumcu et al. |
| 5,385,780 A | 1/1995 | Lee |
| 5,405,936 A | 4/1995 | Mumcu et al. |
| 5,668,242 A | 9/1997 | Simon et al. |
| 5,932,687 A | 8/1999 | Baumann et al. |
| 6,060,550 A | 5/2000 | Simon et al. |
| 6,136,948 A | 10/2000 | Dickens, Jr. et al. |
| 6,149,836 A | 11/2000 | Mumcu et al. |
| 6,211,266 B1 * | 4/2001 | Weber et al. ................ 523/212 |
| 6,300,413 B1 | 10/2001 | Simon et al. |
| 6,316,537 B1 | 11/2001 | Baumann et al. |
| 6,335,101 B1 | 1/2002 | Haeger et al. |
| 6,403,851 B1 | 6/2002 | Wilczok et al. |
| 6,407,304 B1 | 6/2002 | Schiffer et al. |
| 6,444,855 B1 | 9/2002 | Esser et al. |
| 6,462,235 B1 | 10/2002 | Thiele et al. |
| 6,566,555 B1 | 5/2003 | Thiele et al. |
| 6,579,581 B1 | 6/2003 | Bartz et al. |
| 6,589,606 B1 | 7/2003 | Waterkamp et al. |
| 6,610,864 B1 | 8/2003 | Krebs et al. |
| 6,620,970 B1 | 9/2003 | Schiffer et al. |
| 6,639,108 B1 | 10/2003 | Schiffer et al. |
| 6,656,997 B1 | 12/2003 | Baumann et al. |
| 6,664,423 B1 | 12/2003 | Herwig et al. |
| 6,677,015 B1 | 1/2004 | Himmelmann et al. |
| 6,766,091 B1 | 7/2004 | Beuth et al. |
| 6,784,227 B1 | 8/2004 | Simon et al. |
| 6,852,893 B1 | 2/2005 | Kuhnle et al. |
| 6,884,485 B1 | 4/2005 | Baumann et al. |
| 2003/0114636 A1 | 6/2003 | Schiffer et al. |
| 2003/0124281 A1 | 7/2003 | Ries et al. |
| 2003/0191223 A1 | 10/2003 | Waterkamp et al. |
| 2004/0086735 A1 | 5/2004 | Monsheimer et al. |
| 2004/0097636 A1 | 5/2004 | Baumann et al. |
| 2004/0102539 A1 | 5/2004 | Monsheimer et al. |
| 2004/0106691 A1 | 6/2004 | Monsheimer et al. |
| 2004/0137228 A1 | 7/2004 | Monsheimer et al. |
| 2004/0138363 A1 | 7/2004 | Baumann et al. |
| 2004/0140668 A1 | 7/2004 | Monsheimer et al. |
| 2004/0180980 A1 | 9/2004 | Petter et al. |
| 2004/0206443 A1 | 10/2004 | Monsheimer et al. |
| 2005/0014842 A1 | 1/2005 | Baumann et al. |
| 2005/0027047 A1 | 2/2005 | Monsheimer et al. |
| 2005/0027050 A1 | 2/2005 | Monsheimer et al. |
| 2005/0038201 A1 | 2/2005 | Wursche et al. |

FOREIGN PATENT DOCUMENTS

| | | |
|---|---|---|
| EP | 0 255 901 | 2/1988 |
| FR | 1 286 151 | 1/1962 |
| FR | 1 467 732 | 12/1966 |
| FR | 1 545 209 | 9/1968 |
| JP | 6-248088 * | 9/1994 |

OTHER PUBLICATIONS

E. Schmachtenberg, et al., Kunststoffe, Carl Hanser Verlag, vol. 87, No. 6, pp. 773-776, XP-000656866, "Lasersintern Von Polyamid. Laser-Sintering of Polyamide", Jun. 1, 1997.
U.S. Appl. No. 10/565,779, filed Jan. 25, 2006, Monsheimer et al.

* cited by examiner

*Primary Examiner*—Ana Woodward
(74) *Attorney, Agent, or Firm*—Oblon, Spivak, McClelland, Maier & Neustadt, P.C.

(57) ABSTRACT

A sintering powder containing polyamide polymer and titanium dioxide particles, a process for laser sintering, and moldings produced from the sintering powder. The moldings formed using the powder of the invention have improved surface quality due to the powders having increased yellowing resistance when exposed to thermal stress during laser sintering. Moldings produced from the sintering powder have improved mechanical properties, in particular modulus of elasticity.

17 Claims, No Drawings

US 7,148,286 B2

LASER-SINTERING POWDER CONTAINING TITANIUM DIOXIDE PARTICLES, PROCESS FOR ITS PREPARATION, AND MOLDINGS PRODUCED THEREFROM

BACKGROUND OF THE INVENTION

1. Field of the Invention

The invention relates to a laser-sintering powder containing a polyamide such as nylon-12 and titanium dioxide particles, a process for preparing the powder, and moldings produced by selective laser sintering of the powder.

2. Discussion of the Background

Very recently, a requirement has arisen for the rapid production of prototypes. Selective laser sintering is a process particularly well suited to rapid prototyping. In this process, polymer powders are selectively irradiated briefly in a chamber with a laser beam, resulting in melting of the particles of powder exposed to the laser beam. The molten particles fuse and solidify to give a solid mass. Three-dimensional bodies can be produced simply and rapidly by repeatedly applying and irradiating additional layers of the polymer powder.

The process of laser sintering (rapid prototyping) to produce moldings made from pulverulent polymers is described in detail in U.S. Pat. No. 6,136,948 and WO 96/06881. A wide variety of polymers and copolymers are disclosed for this application, e.g. polyacetate, polypropylene, polyethylene, ionomers, and polyamide polymers.

Nylon-12 powder (PA 12) has proven particularly successful for producing moldings by laser sintering, in particular for producing engineering components. Parts manufactured from PA 12 powder meet the high requirements demanded with regard to mechanical loading, and have properties close to the properties exhibited by parts produced by mass-production techniques such as extrusion or injection molding.

The PA 12 powders used in these processes have a median particle size ($d_{50}$) of from 50 to 150 μm, and may be obtained as described in DE 197 08 946 or DE 44 21 454, for example. In EP 0 911 142 it is disclosed that it is preferable to use a nylon-12 powder with a melting point of from 185 to 189° C., an enthalpy of fusion of 112 kJ/mol, and a freezing point of from 138 to 143° C.

Yellowing of moldings is a disadvantage with the polyamide powders currently used. This yellowing can appear on the finished component if the components are exposed to high levels of irradiation with UV-containing light, or to a long period of direct insolation.

However, a yellow tinge can appear during the actual laser sintering, resulting from the long period of severe thermal stress during this process. This effect is observed in particular when large amounts of returned powder are used, i.e. laser-sintering powder which has been previously applied to the molding but was not melted. Yellowing is often associated with impairment of the mechanical properties since aging of the material occurs. Examples of the noticeable effects of such aging include embrittlement, impaired tensile strain at break, and impaired notched impact performance.

SUMMARY OF THE INVENTION

Accordingly, it is an object of the present invention to provide a laser-sintering powder which has improved resistance to the thermal stresses encountered during laser sintering and also has improved aging properties. In addition, the laser-sintering powder should have greater resistance to UV radiation and therefore be suitable for producing moldings which are exposed to light with high UV content.

DETAILED DESCRIPTION OF THE PREFERRED EMBODIMENTS

Surprisingly, it has been found that by adding titanium dioxide to polyamide powders it is possible to prepare sintering powders which can be used to produce laser-sintered moldings which have markedly less sensitivity to thermal stress in comparison to moldings made from conventional sintering powders. The moldings produced with these powders also have higher resistance to UV radiation.

The present invention therefore provides a sintering powder for selective laser sintering which comprises at least one polyamide and titanium dioxide particles.

The present invention also provides a process for preparing the sintering powders of the invention. The process comprises mixing at least one polyamide powder with titanium dioxide particles to give a sintering powder.

The present invention also provides for moldings which comprise titanium dioxide and at least one polyamide produced by laser sintering.

The sintering powder of the invention has the advantage that laser-sintered moldings produced therefrom have markedly higher resistance to UV radiation. It is therefore possible to obtain moldings which show no or only slight signs of yellowing even after a relatively long period of UV irradiation. Yellowing is often associated with impairment of mechanical properties since aging of the material occurs. The moldings of the invention have markedly greater resistance to these aging processes as reflected in less embrittlement, good tensile strain at break, and/or good notched impact performance. The sintering powder of the invention also has improved thermal stability, and provides substantially improved performance in comparison to conventional sintering powder when used as returned powder.

Another advantage of the sintering powder of the invention is that any desired amount (from 0 to 100 parts) of this powder can be mixed with a conventional polyamide based polyamide laser-sintering powder. The resultant powder mixture likewise has better resistance than conventional sintering powder to the thermal stress during laser sintering.

Another surprising effect observed was that moldings produced from the sintering powder of the invention have improved mechanical properties, in particular increased modulus of elasticity.

Without limiting the invention, the sintering powder of the invention is described below as is a process for its preparation.

The invention sintering powder for selective laser sintering comprises at least one polyamide and titanium dioxide particles. The polyamide present in the sintering powder of the invention is preferably a polyamide which has at least 8 carbon atoms per carboxamide group. The sintering powder of the invention preferably comprises at least one polyamide which has 10 or more carbon atoms per carboxamide group. The sintering powder very particularly preferably comprises at least one polyamide selected from nylon-6,12 (PA 612), nylon-11 (PA 11), and nylon-12 (PA 12).

The sintering powder of the invention preferably comprises a polyamide powder with a median particle size $d_{50}$ of from 10 to 250 μm, preferably from 30 to 100 μm, and particularly preferably from 40 to 80 μm.

A particularly suitable powder for laser sintering is a nylon-12 sintering powder which has a melting point of from 185 to 189° C., preferably from 186 to 188° C., an enthalpy of fusion of 112±17 kJ/mol, preferably from 100 to 125 kJ/mol, and a freezing point of from 138 to 143° C., preferably from 140 to 142° C. Processes for preparation of the polyamides which can be used in the sintering powders of the invention are well known and, for example in the case of nylon-12 preparation, can be found in DE 29 06 647, DE 35 10 687, DE 35 10 691 and DE 44 21 454 (those portions of each of which relevant to the production of polyamides is incorporated herein by reference). Polyamide pellets are available commercially from various producers, an example being nylon-12 pellets with the tradename VESTAMID supplied by Degussa AG.

The sintering powder of the invention preferably comprises, based on the entirety of the polyamides present in the powder, from 0.01 to 30% by weight of titanium dioxide particles preferably from 0.1 to 20% by weight of titanium dioxide particles particularly preferably from 0.5 to 15% by weight of titanium dioxide particles, and very particularly preferably from 1 to 10% by weight of titanium dioxide particles. The sintering powder of the invention may comprise a mixture of titanium dioxide particles and polyamide particles, or else comprise a particulate or pulverulent polyamide which comprises incorporated titanium dioxide particles. If the proportion of the titanium dioxide particles, based on the entirety of the polyamides present in the powder, is less than 0.01% by weight, the desired effect of thermal stability and yellowing resistance is markedly reduced. If the proportion of the titanium dioxide particles, based on the entirety of the polyamides present in the powder, is above 30% by weight, there is marked impairment of the mechanical properties, e.g. the tensile strain at break, of moldings produced from these powders.

The titanium dioxide particles present in the sintering powder of the invention are preferably anatase particles and/or rutile particles. Titanium dioxide particles with rutile structure are preferably used.

The sintering powder of the invention may also comprise auxiliaries and/or fillers. Examples of these auxiliaries are flow aids, e.g. precipitated and/or fumed silicas. Examples of precipitated silicas are supplied by Degussa AG with various specifications with the product name AEROSIL. The sintering powder of the invention preferably comprises less than 3% by weight, with preference from 0.001 to 2% by weight, and very particularly preferably from 0.05 to 1% by weight, of these auxiliaries, based on the entirety of the polyamides present. Examples of the fillers are glass particles, metal particles, or ceramic particles, e.g. glass beads, steel balls, or metal grains, or other pigments, e.g. transition metal oxides.

The median particle size of the filler particles is preferably smaller than or about the same as that of the polyamide particles. The extent to which the median particle size $d_{50}$ of the fillers exceeds the median particle size $d_{50}$ of the polyamides should not be more than 20%, preferably not more than 15%, and very particularly preferably not more than 5%. Amounts such as 0.1 to 0.5, 0.5 to 1.0, 1.0 to 2.0 or 2 to 5% are also suitable. The particular limitation of the particle size is given by the layer thickness permissible in the laser-sintering apparatus.

The sintering powder of the invention preferably comprises less than 75% by weight, with preference from 0.001 to 70% by weight, particularly preferably from 0.05 to 50% by weight, and very particularly preferably from 0.5 to 25% by weight, of these fillers, based on the entirety of the polyamides present. Mixtures containing amounts between 0.01 and 30% by weight based on the total amount of the polyamide may be used, such as from 0.01 to 0.1, 0.1 to 1.0, 1 to 2, 2 to 5, 5 to 10, 10 to 20 and 20 to 30%, all ranges and subranges included.

If the maximum amounts for the auxiliaries and/or fillers are exceeded, the result, depending on the filler or auxiliary used, can be a marked impairment of the mechanical properties of moldings produced from these sintering powders. The excess can also result in impairment of the inherent laser-light absorption of the sintering powder, making this powder unusable as a sintering powder for selective laser sintering.

The sintering powder of the invention is easy to prepare, preferably by mixing at least one polyamide powder with titanium dioxide particles, e.g., the invention process for preparing the sintering powder of the invention.

The polyamide powder may be a powder suitable as a laser-sintering powder with which pulverulent titanium dioxide particles are admixed. The titanium dioxide particles preferably have a median particle size smaller than, or about the same as, that of the polyamide particles. The extent to which the median particle size $d_{50}$ of the titanium dioxide particles exceeds the median particle size $d_{50}$ of the polyamides should be not more than 20%, preferably not more than 15%, and very particularly preferably not more than 5%. Mixtures containing amounts between 0.01 and 30% by weight based on the total amount of the polyamide may be used, such as from 0.01 to 0.1, 0.1 to 1.0, 1 to 2, 2 to 5, 5 to 10, 10 to 20 and 20 to 30%, all ranges and subranges included. A particular limitation of the particle size is given by the overall height or layer thickness permissible in the laser-sintering apparatus.

It is also possible to mix conventional sintering powders with sintering powders of the invention. Sintering powders with an ideal combination of mechanical and optical properties can be prepared in this way. The process for preparing these mixtures can be found, for example, in DE 34 41 708 (incorporated herein by reference in its entirety).

In one version of the process for producing the invention powder, the titanium dioxide particles are compounded into a polyamide, and the resultant titanium-oxide-containing polyamide is processed to give a laser-sintering powder. In this version of the process, it is preferable to use titanium dioxide particles whose median particle size is smaller than 10 µm, preferably smaller than 1 µm, and very particularly preferably from 0.01 µm to 0.75 µm. The compounding usually gives pellets which are then processed to give a sintering powder. Examples of processing methods are grinding or reprecipitation. Compared with the pure mixing process, incorporation of the titanium dioxide particles by compounding has the advantage of achieving greater uniformity of distribution of the titanium dioxide particles within the sintering powder.

In another preferred version of the process the titanium dioxide is added prior to the process of precipitating the polyamide. This type of precipitation process is described by way of example in DE 35 10 687 and DE 29 06 647 (both of which are incorporated herein by reference in their entirety). An example of the use of this process is the precipitation of nylon-12 from a polyamide/ethanol solution by removal of ethanol with simultaneous reduction in the temperature of the solution. If the polyamide/ethanol solution comprises suspended titanium dioxide particles, the result is a precipitated titanium-dioxide-containing polyamide powder. Reference is made to DE 35 10 687 and DE 29 06 647 for a detailed description of the process. The skilled worker will rapidly recognize that a modified form of this process can also be used on other polyamides, a precondition being that the selection of polyamide and solvent is such that the polyamide dissolves (at an elevated temperature) in the solvent, and the polyamide precipitates from the solution at a lower temperature and/or when the solvent is removed. Addition of titanium dioxide particles of suitable particle size to this solution gives the respective titanium-dioxide-containing polyamides.

The titanium dioxide particles used in the invention powder may be commercially available pigments. Titanium dioxide particles are usually treated inorganically or organically to increase their aging resistance and weathering resistance. Examples of treated and untreated titanium dioxide particles may be obtained from DuPont, Sachtleben Chemie, Kronos or ICI.

To improve the processability of the sintering powder, or for further modification of the same, the powder may include other inorganic pigments, e.g. transition metal oxides, and/or stabilizers, e.g phenols, in particular sterically hindered phenols, flow aids, e.g. fumed silicas, and/or filler particles. The amounts of these materials added to the polyamides, based on the total weight of polyamides in the sintering powder, are preferably such as to comply with the concentrations given for fillers and/or auxiliaries in the sintering powder of the invention.

The present invention also provides a process for producing moldings by selective laser sintering using the sintering powders of the invention. The present invention in particular provides a process for producing moldings by selective laser sintering of a titanium-dioxide-containing precipitated powder based on a nylon-12 polymer which has a melting point of from 185 to 189° C., an enthalpy of fusion of 112±17 J/g, and a freezing point of from 138 to 143° C., the use of which is described in U.S. Pat. No. 6,245,281 (incorporated herein by reference).

These processes are well known and are based on the selective sintering of polymer particles where layers of polymer particles are briefly exposed to a laser light thus fusing the polymer particles exposed to the laser light. Repeated sintering of layers of polymer particles produces three-dimensional objects. Details of the selective laser sintering process are found by way of example in U.S. Pat. No. 6,136,948 and WO 96/06881.

The moldings of the invention, which are produced by selective laser sintering comprise a titanium-dioxide-containing polyamide (e.g. a polyamide with a very fine arrangement of titanium dioxide particles). The moldings of the invention preferably comprise at least one titanium-dioxide-containing polyamide which has at least 8 carbon atoms per carboxamide group. Moldings of the invention very particularly preferably comprise at least one titanium-dioxide-containing nylon-6,12, nylon-11, and/or one nylon-12.

The titanium dioxide present in the molding of the invention may either have an anatase or rutile crystal structure. The titanium dioxide present in the moldings of the invention preferably has a rutile structure. However, in principle it is also possible to use mixed crystals and/or amorphous titanium dioxide. The molding of the invention preferably comprises, based on the entirety of the polyamides present in the molding, from 0.01 to 30% by weight of titanium dioxide, preferably from 0.1 to 20% by weight, particularly preferably from 0.5 to 15% by weight, and very particularly preferably from 1 to 10% by weight. Mixtures containing amounts between 0.01 and 30% by weight based on the total amount of the polyamide maybe used, such as from 0.01 to 0.1, 0.1 to 1.0, 1 to 2, 2 to 5, 5 to 10, 10 to 20 and 20 to 30%, all ranges and subranges included.

The moldings may also comprise fillers and/or auxiliaries, e.g. heat stabilizers including for example sterically hindered phenol derivatives. Examples of fillers are glass particles, ceramic particles, and metal particles, such as iron shot, and/or the corresponding hollow beads. The moldings of the invention preferably comprise glass particles, very particularly preferably glass beads. Moldings of the invention preferably comprise less than 3% by weight, preferably from 0.001 to 2% by weight, and very particularly preferably from 0.05 to 1% by weight, of these auxiliaries, based on the total amount of the polyamides present. Moldings of the invention also comprise with preference less than 75% by weight, with preference from 0.001 to 70% by weight, and with particular preference from 0.05 to 50% by weight, and with very particular preference from 0.5 to 25% by weight, of these fillers, based on the total amount of the polyamides present.

The examples below are intended to describe the sintering powder of the invention and its use, but are not intended to further limit the invention.

EXAMPLE 1

Reprecipitation of Unpigmented Nylon-12 (PA 12)

Over a period of 5 hours in a 3 m$^3$ stirred vessel (d=160 cm), 400 kg of unregulated PA 12 prepared by hydrolytic polymerization of laurolactam and having a relative solution viscosity $\eta_{rel.}$ of 1.61 (in acidified m-cresol) and an end group content [COOH]=72 mmol/kg and [NH$_2$]=68 mmol/kg were heated to 145° C. with 2500 l of ethanol comprising 2-butanone and 1% of water, and held at this temperature for 1 hour, with stirring (blade stirrer, d=80 cm, rotation rate=85 rpm).

The jacket temperature was then reduced to 124° C., and the internal temperature was brought to 125° C. using a cooling rate of 25 K/h at the same stirrer rotation rate, with continuous ethanol removal by distillation. From this juncture onward, the jacket temperature was kept below the internal temperature by from 2 to 3 K while maintaining the same cooling rate until at 109° C. the precipitation began, detectable via the heat generated. The distillation rate was increased in such a way as to prevent the internal temperature rising above 109.3° C. After 20 minutes, the internal temperature fell, indicating the end of the precipitation. Further removal of material by distillation and cooling via the jacket brought the temperature of the suspension to 45° C., and the suspension was then transferred to a paddle dryer. The ethanol was removed by distillation at 70° C./400 mbar, and the residue was then post-dried at 20 mbar/85° C. for 3 hours. This gave a precipitated PA 12. The resultant product was analyzed by screening, the result being as follows:

| | |
|---|---|
| <32 µm: | 8% by weight |
| <40 µm: | 17% by weight |
| <50 µm: | 26% by weight |
| <63 µm: | 55% by weight |
| <80 µm: | 92% by weight |
| <100 µm: | 100% by weight |

The bulk density was 433 g/l.

EXAMPLE 2

Reprecipitation of PA 12 Pigmented Powder

Example 1 was repeated, but 24 kg (corr. 6%) of K-2310 (Kronos) titanium dioxide pigment was added prior to the solution process. Precipitation and drying took place as described above. This gave a precipitated PA 12 which comprises titanium dioxide particles. The resultant product was analyzed by screening, the result being as follows:

| | |
|---|---|
| <32 μm: | 7% by weight |
| <40 μm: | 16% by weight |
| <50 μm: | 28% by weight |
| <63 μm: | 59% by weight |
| <80 μm: | 95% by weight |
| <100 μm: | 100% by weight |

The bulk density was 463 g/l.

EXAMPLE 3

Reprecipitation of PA 12 Pigmented Powder

Example 1 was repeated, but 4 kg (corr. 1%) of K-2310 (Kronos) titanium dioxide pigment was added prior to the solution process. Precipitation and drying took place as described above. This gave a precipitated PA 12 which comprises titanium dioxide particles. The resultant product was analyzed by screening, the result being as follows:

| | |
|---|---|
| <32 μm: | 6% by weight |
| <40 μm: | 17% by weight |
| <50 μm: | 26% by weight |
| <63 μm: | 57% by weight |
| <80 μm: | 93% by weight |
| <100 μm: | 100% by weight |

The bulk density was 448 g/l.

EXAMPLE 4

Comparative Example

For test purposes, a type 1b test specimen to DIN EN ISO 527 (multipurpose test specimen) was produced from the precipitated powder of Example 1 on a laser sintering plant (EOSINT P360, from the company EOS). The results of the mechanical tests on this molding are given in Table 1.

EXAMPLE 5

Inventive

For test purposes, a type 1b test specimen to DIN EN ISO 527 (multipurpose test specimen) was produced from the precipitated powder of Example 2 on a laser sintering plant (EOSINT P360, from the company EOS). The results of the mechanical tests on this molding are given in Table 1.

EXAMPLE 6

Inventive

For test purposes, a type 1b test specimen to DIN EN ISO 527 (multipurpose test specimen) was produced from the precipitated powder of Example 3 on a laser sintering plant (EOSINT P360, from the company EOS). The results of the mechanical tests on this molding are given in Table 1.

EXAMPLE 7

Inventive

The powder from Example 1 was treated with glass beads ($d_{50=60}$ μm) as filler in the ratio 3:2, and mixed. This mixture was mixed with the titanium-dioxide-containing PA powder from Example 3 in the ratio 2:1. This mixture was used in a laser sintering plant as in Example 4 to produce a molding as in Example 4. The results of the mechanical tests on this molding are given in Table 1.

EXAMPLE 8

Inventive

Example 5 was repeated, but 0.1% by weight of a fumed silica (AEROSIL 200, Degussa AG) was also added as flow aid to the PA 12 powder from Example 1. The results of the mechanical tests on this molding are given in Table 1.

EXAMPLE 9

Inventive

The powder from Example 1 was mixed with the titanium-dioxide-containing PA powder from Example 3 in a mixer in the ratio 7:3. This mixture was used in a laser sintering plant as in Example 4 to produce a molding as in Example 4. The results of the mechanical tests on this molding are given in Table 1.

TABLE 1

Results of mechanical tests on moldings of the examples

| Example | Modulus of elasticity [–] | Tensile strength [N/mm$^2$] | Tensile strength at break [%] |
|---|---|---|---|
| 4 | 1674 | 47.5 | 22.7 |
| 5 | 1955 | 47.6 | 6.7 |
| 6 | 1805 | 49.1 | 17.9 |
| 7 | 3337 | 46.4 | 3.4 |
| 8 | 1912 | 47.5 | 9.0 |
| 9 | 1885 | 48.0 | 19.3 |

From the examples it can be seen very clearly that the moldings of the invention made from sintering powder of the invention as in Examples 5 to 9 have markedly higher modulus of elasticity than moldings made from conventional sintering powder. The tensile strength of the moldings of the invention is little different, if at all, from the tensile strength of the molding made from conventional sintering powder. The tensile strain at break shows that moldings of the invention have markedly lower tensile strain at break. Since a higher modulus of elasticity results in lower flexibility and low tensile strain at break, the powder of the invention can therefore be laser-sintered to produce prototype components which have to have high dimensional stability, e.g. gearwheels.

Obviously, numerous modifications and variations of the present invention are possible in light of the above teachings. It is therefore to be understood that within the scope of the appended claims, the invention may be practiced otherwise than as specifically described herein.

The invention claimed is:

1. A laser sintering powder comprising (a) at least one polyamide; (b) titanium dioxide particles, and (c) at least one flow aid which is a precipitated and/or fumed silica, wherein the at least one polyamide is nylon-6,12, nylon-11, nylon-12, or mixtures thereof.

2. The sintering powder as claimed in claim 1, comprising from 0.01 to 30% by weight of titanium dioxide particles based on total amount of the at least one polyamide present in the powder.

3. The sintering powder as claimed in claim 2, comprising from 0.5 to 15% by weight of titanium dioxide particles based on the total amount of the at least one polyamide present in the powder.

4. The sintering powder as claimed in claim 1, comprising a mixture of titanium dioxide particles and particles of the at least one polyamide.

5. The sintering powder as claimed in claim 1, comprising titanium dioxide particles incorporated within polyamide particles.

6. The sintering powder as claimed in claim 1, wherein the titanium dioxide particles are anatase particles, rutile particles or a mixture of anatase and rutile particles.

7. The sintering powder as claimed in claim 1, further comprising at least one filler comprising glass particles.

8. A process for preparing sintering powder as claimed in claim 1, comprising mixing at least one polyamide powder with said titanium dioxide particles and said at least one flow aid.

9. The process as claimed in claim 8, wherein mixing includes compounding the titanium dioxide particles into the polyamide powder.

10. The laser sintering powder as claimed in claim 1, wherein the at least one polyamide has a median particle size of from 40 to 250 μm.

11. A process for producing moldings comprising:
selectively laser-sintering a sintering powder comprising (a) at least one polyamide; and (b) titanium dioxide particles, wherein the at least one polyamide is nylon-6,12, nylon-11, nylon-12, or mixtures thereof.

12. A molding produced by laser sintering a powder which comprises titanium dioxide and at least one polyamide having a median particle size of from 40 to 250 μm, wherein the at least one polyamide is nylon-6,12, nylon-11, nylon-12, or mixtures thereof.

13. The molding as claimed in claim 12, wherein the powder comprises from 0.01 to 30% by weight of titanium dioxide particles, based on the total amount of the polyamide present in the powder.

14. The molding as claimed in claim 13, wherein the powder comprises from 0.5 to 15% by weight of titanium dioxide particles based on the total amount of the polyamide present in the powder.

15. The molding as claimed in claim 12, wherein the titanium dioxide particles are anatase particles, rutile particles, or a mixture thereof.

16. The molding as claimed in claim 12, further comprising one or more fillers.

17. The molding as claimed in claim 16, wherein the one or more fillers are glass particles.

* * * * *